(12) United States Patent
Kato

(10) Patent No.: US 8,274,669 B2
(45) Date of Patent: Sep. 25, 2012

(54) IMAGE FORMING APPARATUS

(75) Inventor: Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 691 days.

(21) Appl. No.: 12/219,279

(22) Filed: Jul. 18, 2008

(65) Prior Publication Data

US 2009/0033972 A1 Feb. 5, 2009

(30) Foreign Application Priority Data

Jul. 31, 2007 (JP) ................................. 2007-199932
Nov. 22, 2007 (JP) ................................. 2007-302394

(51) Int. Cl.
*G06F 3/12* (2006.01)
*H04L 12/26* (2006.01)
*G03G 15/00* (2006.01)
(52) U.S. Cl. .................... 358/1.13; 370/252; 399/89
(58) Field of Classification Search .................. 358/1.15, 358/1.13; 370/252; 399/89
See application file for complete search history.

(56) References Cited

U.S. PATENT DOCUMENTS

| | | | | |
|---|---|---|---|---|
| 6,978,114 B2 * | 12/2005 | Okamoto et al. | ............ | 399/389 |
| 7,817,573 B2 * | 10/2010 | Koezuka | ................. | 370/252 |
| 2004/0223185 A1 | 11/2004 | Yamada et al. | | |
| 2005/0241001 A1 | 10/2005 | Parry et al. | | |
| 2007/0024892 A1 | 2/2007 | Cho | | |
| 2007/0035762 A1 | 2/2007 | Wilsher et al. | | |
| 2007/0061474 A1 | 3/2007 | Quach et al. | | |
| 2009/0033984 A1 * | 2/2009 | Sahashi | ................. | 358/1.15 |

FOREIGN PATENT DOCUMENTS

| | | |
|---|---|---|
| JP | 2003-036151 | 2/2003 |
| JP | 2005-099945 | 4/2005 |
| JP | 2005-202824 | 7/2005 |
| JP | 2007-156786 | 6/2007 |
| JP | 2007-226344 | 9/2007 |

OTHER PUBLICATIONS

European Search Report dated May 7, 2011 in corresponding European Patent Application No. 08252523.9.
Office Action for corresponding Japanese Application No. 2007-302394 issued Dec. 6, 2011.

* cited by examiner

*Primary Examiner* — Charlotte M Baker
*Assistant Examiner* — Justin Katzwhite
(74) *Attorney, Agent, or Firm* — Harness, Dickey & Pierce

(57) ABSTRACT

A disclosed image forming apparatus performs communications in a non-contact manner with a mobile terminal device storing print information. The image forming apparatus stores, in association with each other, identification information for identifying a reading unit configured to read the print information, function information indicating a function of processing the print information, and function setting information indicating process contents of the function; reads the print information stored in the mobile terminal device with a reading unit disposed in the image forming apparatus at a position according to the function information and the function setting information; acquires the stored function information and function setting information associated with the identification information held by the reading unit that has read the print information; and processes the print information based on the acquired function information and function setting information.

3 Claims, 12 Drawing Sheets

| READER/WRITER UNIT ID | FUNCTION ID | SETTING VALUE |
|---|---|---|
| 1 | OUTTRAY | INTERNAL |
| 2 | OUTTRAY | FINISHERUPPER |
| 3 | OUTTRAY | FINISHERLOWER |
| ⋮ | ⋮ | ⋮ |

FIG.7

| MFP ID | FUNCTION ID | SETTING VALUE |

FIG.10

| AFFILIATION INFORMATION | PRINT DATA |
|---|---|
| AFFILIATION INFORMATION 1 | PRINT DATA 1 |
| ⋮ | ⋮ |
| AFFILIATION INFORMATION s | PRINT DATA s |
| ⋮ | ⋮ |

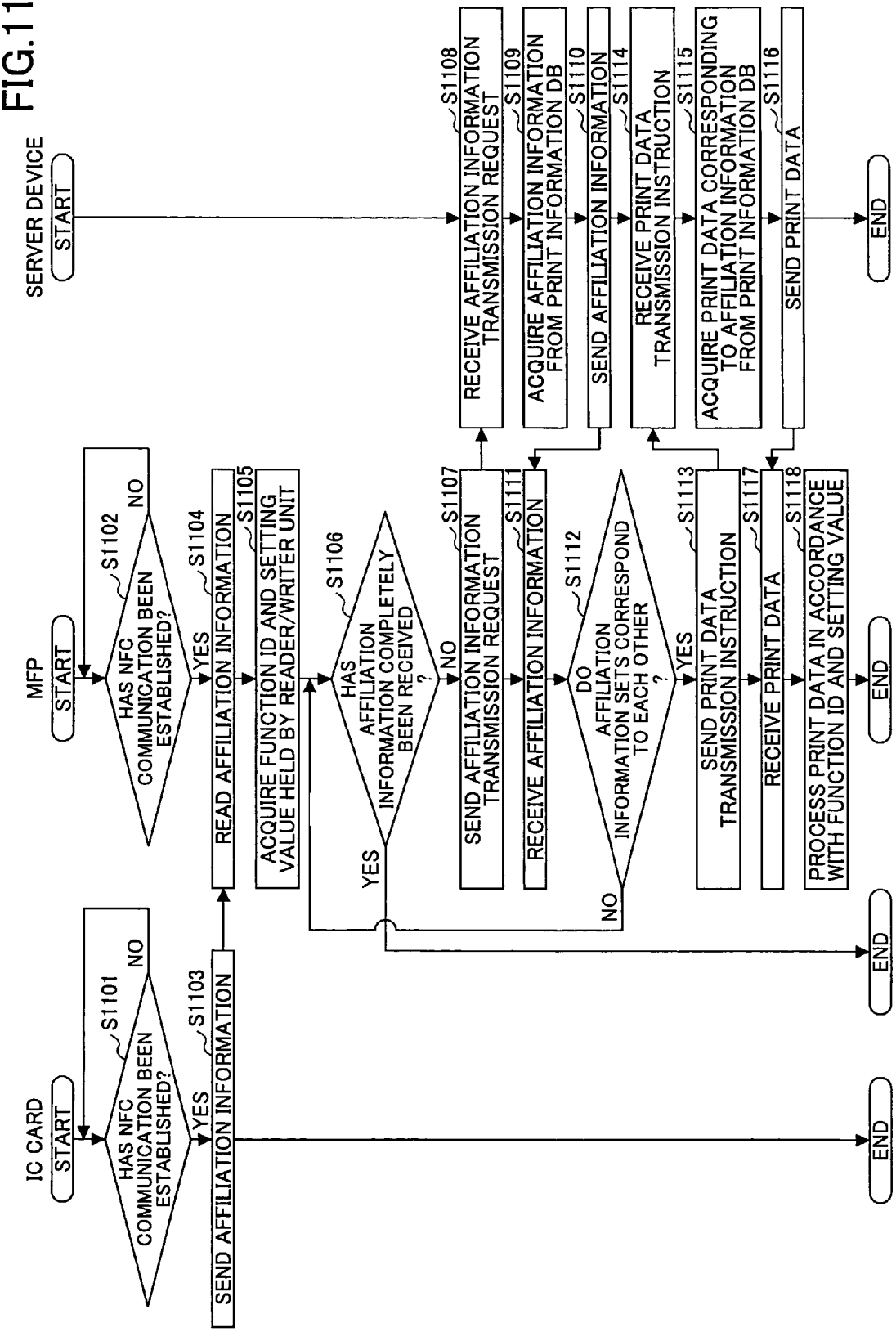

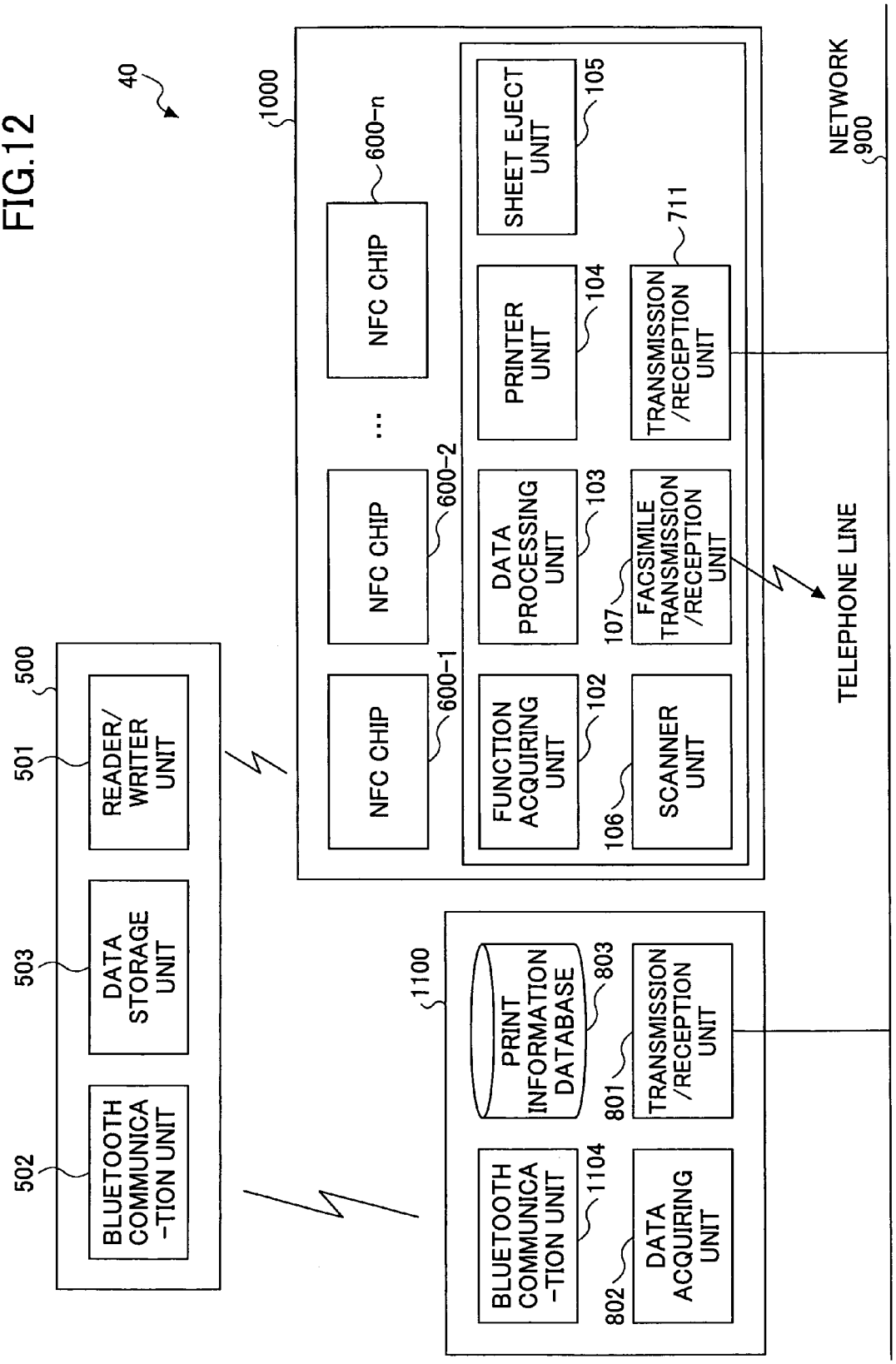

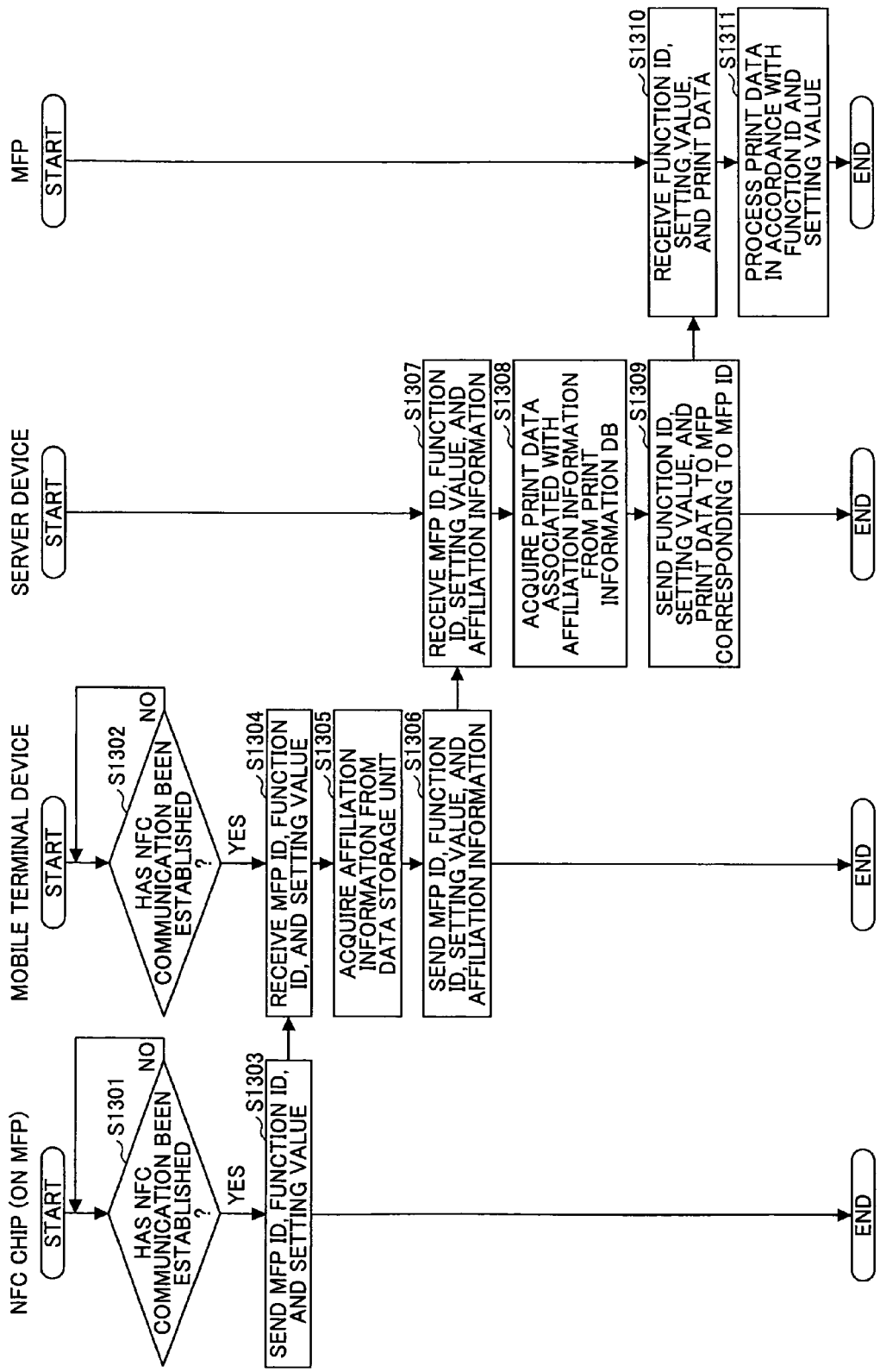

IMAGE FORMING APPARATUS

BACKGROUND OF THE INVENTION

1. Field of the Invention

The present invention relates to an image forming apparatus.

2. Description of the Related Art

In recent years and continuing, office devices can be interconnected via a network, and therefore such devices can operate in close coordination with each other. Printers are not an exception. In a case of directing the printing of a document from a client terminal such as a personal computer, it is possible to specify a desired printer as the output destination among plural printers connected to the network.

However, in order to specify a printer connected via the network to print out data, it is necessary to specify identification information of the printer at the client terminal, which requires the user to perform time-consuming operations.

In an attempt to solve such a problem, an output system provided with a server for mediating printing processes is disclosed (see Patent Document 1). In such an output system, print data and print request information are stored beforehand in a print mediation server. Identification information is sent to a printer from a mobile phone, and is verified. Accordingly, the printer that is the output destination is specified, and the print data are output from the printer.

Patent Document 1: Japanese Laid-Open Patent Application No. 2003-036151

However, with the technology described in Patent Document 1, the user can specify the desired printer to be used for printing, but cannot specify the desired tray to be used for ejecting a medium. Specifically, the tray specified in the print request information which has been stored in the print mediation server by the user is the tray used for ejecting a medium with print data. Therefore, even when the user notices that the specified tray is empty at the time of specifying the printer, the user cannot specify another tray.

SUMMARY OF THE INVENTION

The present invention provides an image forming apparatus in which one or more of the above-described disadvantages are eliminated.

A preferred embodiment of the present invention provides an image forming apparatus in which the device and the sheet eject tray to be used for outputting print data can be easily specified.

An embodiment of the present invention provides an image forming apparatus for performing communications in a non-contact manner with a separate device storing print information, the separate device being a mobile terminal device, the image forming apparatus including a function association storing unit configured to store, in association with each other, identification information for identifying a reading unit configured to read the print information, function information indicating a function of processing the print information, and function setting information indicating process contents of the function; the reading unit configured to read the print information stored in the mobile terminal device, the reading unit being disposed in the image forming apparatus at a position according to the function information and the function setting information; a function acquiring unit configured to acquire, from the function association storing unit, the function information and the function setting information associated with the identification information held by the reading unit that has read the print information; and a processing unit configured to process the print information based on the function information and the function setting information acquired by the function acquiring unit.

An embodiment of the present invention provides an image forming apparatus for performing communications in a non-contact manner with a first separate device, the first separate device being a mobile terminal device, wherein the image forming apparatus is connected to a second separate device via a network, the second separate device being a server device, the image forming apparatus including a reading unit configured to read, from the mobile terminal device, affiliation information indicating an owner of print information; a function acquiring unit configured to acquire function information and function setting information held by the reading unit that has read the affiliation information; a receiving unit configured to receive, from the server device, the print information associated with the affiliation information read by the reading unit; and a processing unit configured to process the print information received by the receiving unit in accordance with the function information and the function setting information acquired by the function acquiring unit.

An embodiment of the present invention provides an image forming apparatus for performing communications in a non-contact manner with a separate device configured to store print information and read information stored in an information storage medium, the separate device being a mobile terminal device, the image forming apparatus including a receiving unit configured to receive, from the mobile terminal device, the print information, image forming apparatus identification information for identifying the image forming apparatus, which image forming apparatus identification information has been read by the mobile terminal device from the information storage medium provided in the image forming apparatus, function information indicating a function of processing the print information, and function setting information indicating process contents of the function; and a processing unit configured to process the print information based on the print information, the function information, and the function setting information received by the receiving unit.

According to one embodiment of the present invention, a user can directly give an instruction for specifying a sheet eject tray by bringing a mobile terminal device to one of the trays of a multifunction peripheral, so that a reader/writer provided at the tray reads print data stored in the mobile terminal device. Therefore, the user can easily specify the device and the paper eject tray to be used for outputting print data.

BRIEF DESCRIPTION OF THE DRAWINGS

Other objects, features and advantages of the present invention will become more apparent from the following detailed description when read in conjunction with the accompanying drawings, in which:

FIG. 7 illustrates an example of data stored in an NFC chip;

FIG. 10 illustrates an example of a data configuration of a print information database;

FIG. 11 is a flowchart of function setting/function processing procedures performed by the printing system according to the third embodiment of the present invention;

FIG. 12 is a block diagram of a printing system according to a fourth embodiment of the present invention; and FIG. 13 is a flowchart of function setting/function processing procedures performed by the printing system according to the fourth embodiment of the present invention.

DETAILED DESCRIPTION OF THE PREFERRED EMBODIMENTS

A description is given, with reference to the accompanying drawings, of an embodiment of the present invention.

First Embodiment

A description is given of a first embodiment of the present invention with reference to the accompanying drawings. In the present embodiment, a so-called multifunction peripheral (MFP) is applied as an image forming apparatus. Specifically, the MFP is provided with functions of a copier, a fax machine, a printer, a scanner, and a function for delivering an input image (an image of an original scanned by the scanner function or an image input with the printer function or the fax function).

Figure 1:
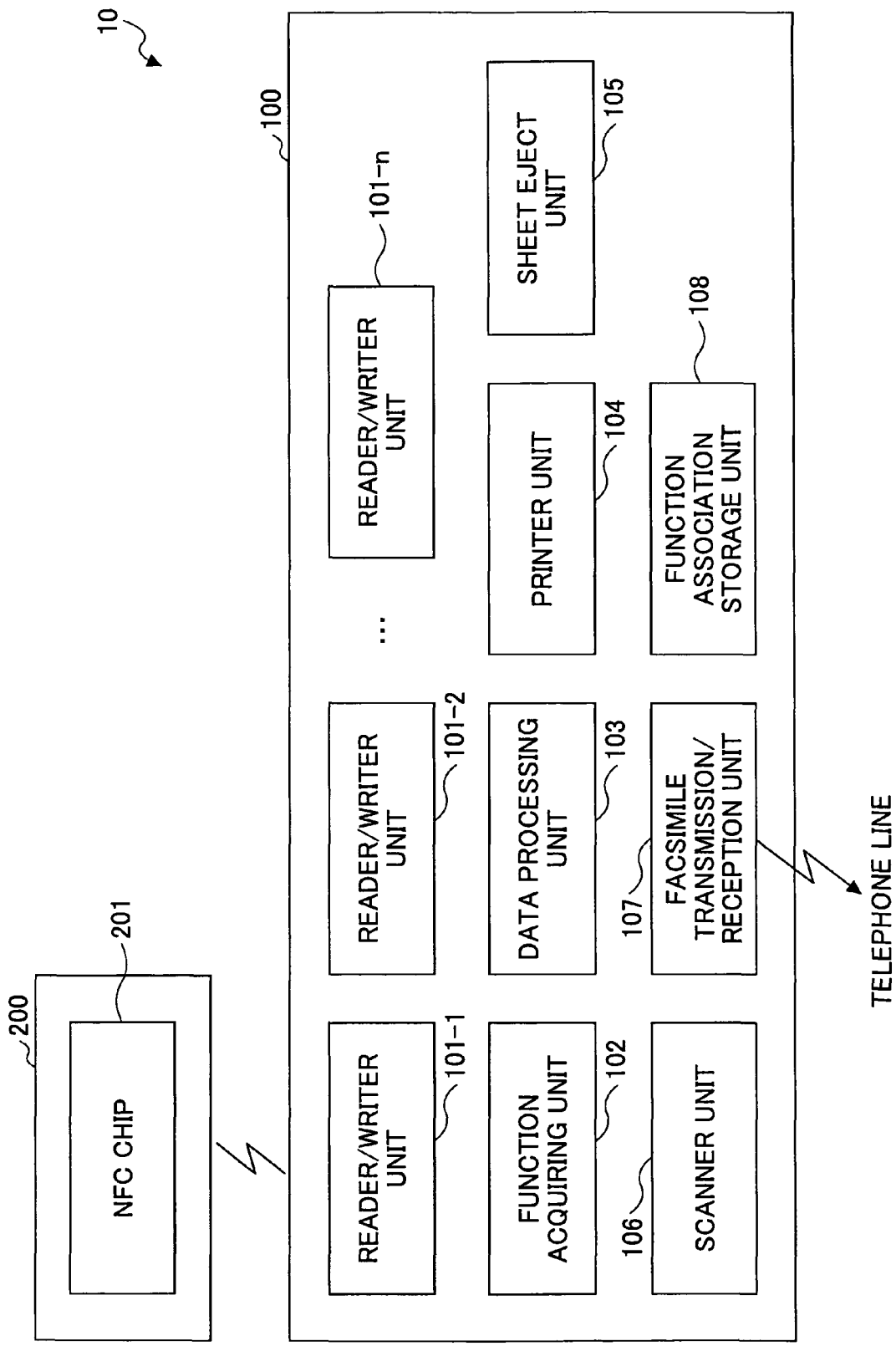
FIG. 1 is a block diagram of a printing system according to a first embodiment of the present invention.

A description is given of a configuration of a printing system including the MFP to which an embodiment of the present invention is applied and a mobile terminal device. FIG. 1 is a block diagram of a printing system according to the first embodiment of the present invention. A printing system 10 according to the first embodiment includes an MFP 100 and a mobile terminal device 200. The MFP 100 and the mobile terminal device 200 can communicate with each other by non-contact communication. The MFP 100 is connected to a telephone line, and is connected to other MFPs, fax machines, and client terminal devices (not shown) via the telephone line, so that facsimile transmission can be performed therebetween.

A description is given of the mobile terminal device 200. The mobile terminal device 200 can perform non-contact bidirectional communications with the MFP 100 according to a non-contact wireless communication specification referred to as NFC (Near Field Communication). Specifically, the mobile terminal device 200 functions as a tag and and/or a reader/writer. In this case, the mobile terminal device 200 has an IC card provided with an NFC chip 201 including a built-in tag and a communication control program for controlling establishment of communication and data transmission/reception (hereinafter, the mobile terminal device 200 is also referred to as an IC card 200). Print data are stored in this tag. The print data can be image data, document data, text data, or any other type of data.

When the IC card 200 is present in the communications region of a reader/writer unit 101 of the MFP 100, the IC card 200 establishes communication with the reader/writer unit 101. The data can be transmitted when the reader/writer unit 101 reads the information in the tag. The storage capacity of the tag is approximately 32 kilobytes, and the communication speed between the tag and the reader/writer unit 101 is approximately 800 Kbps. The data can be written into the tag with the use of the reader/writer unit 101, or with the use of an I/F such as USB (Universal Serial Bus) (not shown).

In the present embodiment, an IC card is taken as an example to describe the mobile terminal device 200; however, the mobile terminal device 200 can be a mobile phone, a PDA (Personal Digital Assistant), a notebook computer, or a portable information storage medium, which includes the NFC chip 201.

Next, a description is given of the MFP 100. The MFP 100 includes the reader/writer units 101-1 through 101-n, a function acquiring unit 102, a data processing unit 103, a printer unit 104, a sheet eject unit 105, a scanner unit 106, a facsimile transmission/reception unit 107, and a function association storage unit 108.

The reader/writer units 101-1 through 101-n (collectively referred to as reader/writer units 101) function as reader/writer units for NFC, as described above. Each of the reader/writer units 101 is provided at one of the plural sheet eject trays of the MFP 100. When the IC card 200 is present in the communication region of one of the reader/writer units 101, the corresponding reader/writer unit 101 reads the print data stored in the IC card 200. The reader/writer unit 101 performs non-contact communication with the IC card 200 according to a non-contact wireless communication specification for ICs referred to as NFC. Specifically, each of the reader/writer units 101 includes a communication program for reading, in a non-contact manner, data from the tag of the IC card 200. The communication region is typically zero through several tens cm. The range of the communication region is set at, for example, approximately 5 mm, so that one of the plural reader/writer units 101 provided in the MFP 100 can recognize that it is specified by the IC card 200 held by the user. That is, the range of the communication region is set to make it possible to recognize which reader/writer unit 101 is specified. Furthermore, the reader/writer unit 101 sends, to the data processing unit 103, the print data that it has read, and also sends, to the function acquiring unit 102, a reader/writer unit ID identifying itself and held by itself.

Figures 2, 3:
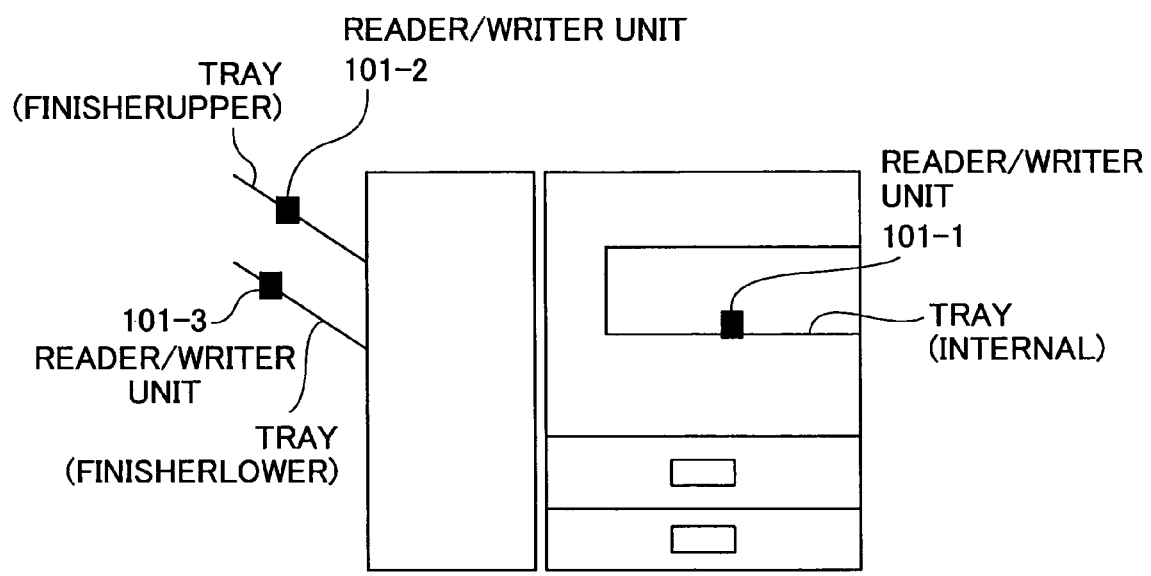
FIG. 2 illustrates examples of positions where reader/writer units are provided.
FIG. 3 illustrates an example of the data configuration of a function association storage unit.

FIG. 2 illustrates examples of positions where the reader/writer units 101 are provided. As shown in FIG. 2, each of the reader/writer units 101-1 through 101-3 is provided at one of the plural sheet eject trays of the MFP 100. When each of the reader/writer units 101 is provided at one of the sheet eject trays in this manner, and the user brings the IC card 200 near one of the reader/writer units 101 provided at one of the sheet eject trays, the print data are read by the corresponding reader/writer unit 101, and an instruction is given to specify the sheet eject tray to be used for ejecting an output medium (for example, a sheet with print data).

The function association storage unit 108 stores reader/writer unit IDs for identifying the reader/writer units 101 and functions specified as the data are read when the IC card 200 is brought near the reader/writer unit 101. FIG. 3 illustrates an example of the data configuration of the function association storage unit 108. The function association storage unit 108 stores reader/writer unit IDs, function IDs, and setting values in association with each other. As shown in FIG. 3, a function ID "outtray" and a setting value "internal" are set in association with a reader/writer unit ID "1".

The process to be performed on the print data is determined when the function acquiring unit 102 acquires, from the function association storage unit 108, a function ID and a setting value associated with the ID of the reader/writer unit 101 that has received print data from the IC card 200. As shown in FIG. 3, the function association storage unit 108 stores the function ID "outtray" and the setting value "internal" in association with the reader/writer unit ID "1". Therefore, when the reader/writer unit ID "1" is acquired, an instruction is given to specify a sheet eject tray for the output medium, which is the "internal" tray.

The data processing unit 103 performs image processing and layout processing on the print data read by the reader/writer unit 101. The printer unit 104 prints, onto an output medium, the print data that has undergone the image processing and the layout processing performed by the data processing unit 103.

The sheet eject unit 105 performs a control operation for ejecting the output medium onto a tray. The sheet eject unit 105 ejects the output medium, on which the print data are printed by the printer unit 104, to the sheet eject tray in accordance with the function ID and the setting value acquired by the function acquiring unit 102. For example, with reference to FIG. 2, when the IC card 200 is brought near the reader/writer unit 101-1 so that the print data are read by the reader/writer unit 101-1, the output medium is ejected to the "internal" tray as a result of the above process.

The scanner unit 106 scans an original with an imaging device such as a CCD (Charge Coupled Device). The scanner unit 106 can be provided with an ADF (Auto-Document Feeder) to perform automatic document feeding.

The facsimile transmission/reception unit 107 sends data scanned by the scanner unit 106 and data transmitted from the IC card 200 to another MFP, fax machine, or client terminal, via the network. Furthermore, the facsimile transmission/reception unit 107 receives data sent by another MFP, fax machine, or client terminal.

Figure 4:
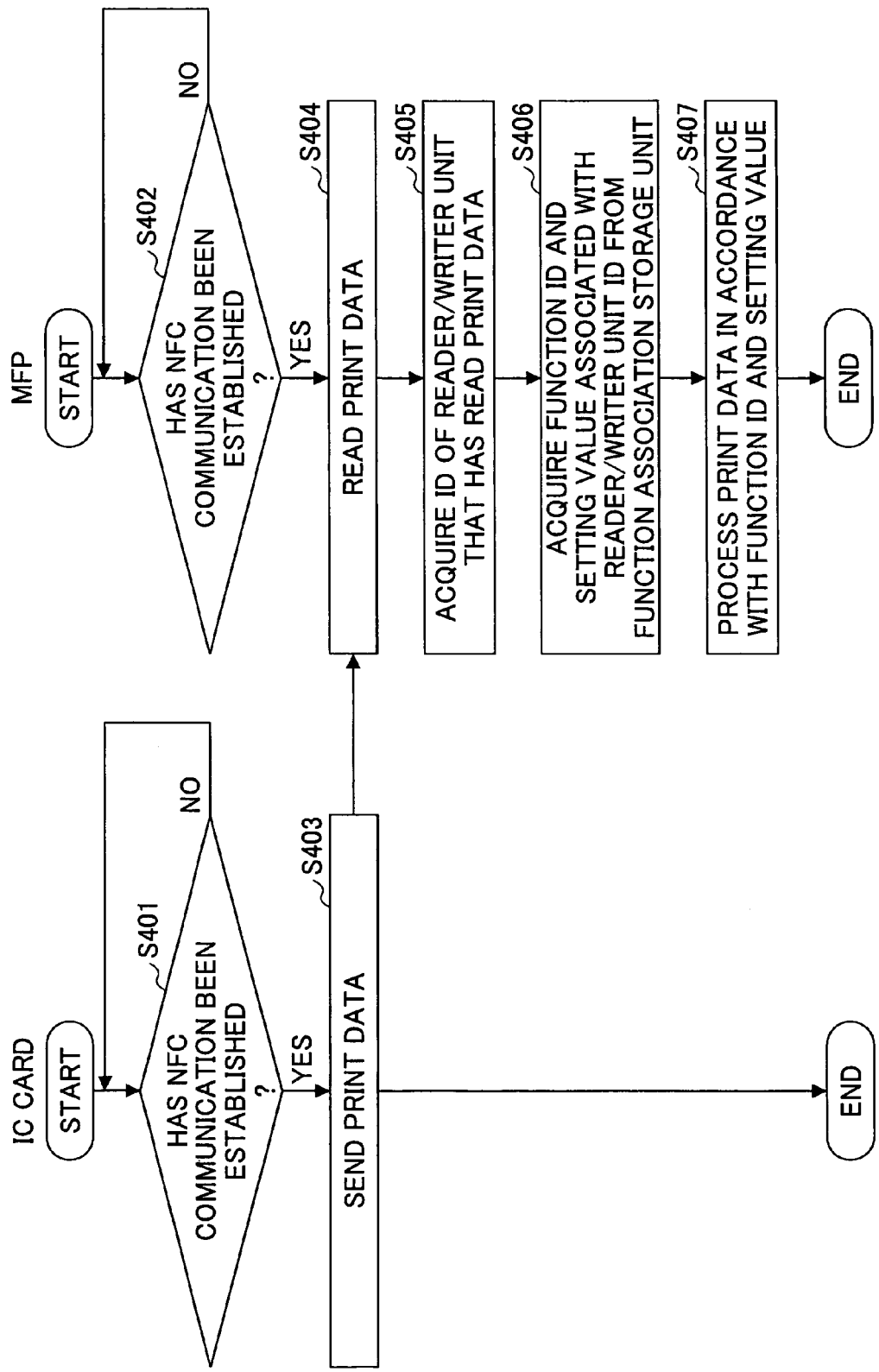
FIG. 4 is a flowchart of function setting/function processing procedures performed by the printing system according to the first embodiment of the present invention.

Next, a description is given of function setting/function processing procedures performed by the printing system 10 including the MFP 100 and the IC card 200 having the above configurations. FIG. 4 is a flowchart of function setting/function processing procedures performed by the printing system 10.

First, in the IC card 200, the NFC chip 201 determines whether NFC communication has been established with the reader/writer unit 101 of the MFP 100 (step S401). When the NFC chip 201 determines that NFC communication has not been established, i.e., the IC card 200 is not present in the communication region of any of the reader/writer units 101 (No in step S401), step S401 is repeated until communication is established with the reader/writer unit 101 of the MFP 100.

Similarly, each of the reader/writer units 101-1 through 101-n of the MFP 100 determines whether NFC communication has been established with the NFC chip 201 of the IC card 200 (step S402). When the reader/writer unit 101 determines that NFC communication has not been established, i.e., the IC card 200 is not present in the communication region of any of the reader/writer units 101 (No in step S402), step S402 is repeated until communication is established with the NFC chip 201 of the IC card 200.

Next, when NFC communication is established, i.e., the IC card 200 is present in the communication region of one of the reader/writer units 101-1 through 101-n (Yes in step S401), the NFC chip 201 sends out print data (step S403). When "the IC card 200 is present in the communication region", it means that the IC card 200 held by the user is touching one of the reader/writer units 101 of the MFP 100, so that the user can surely give an instruction to specify the tray to which the output medium is to be ejected.

When one of the reader/writer units 101 in the MFP 100 determines that NFC communication has been established, i.e., the IC card 200 is present in the communication region of one of the reader/writer units 101 (Yes in step S402), the corresponding reader/writer unit 101 reads the print data from the NFC chip 201 of the IC card 200 (step S404). The function acquiring unit 102 acquires the ID (reader/writer unit ID) of the reader/writer unit 101 that has read the print data (step S405). The function acquiring unit 102 acquires, from the function association storage unit 108, the function ID and the setting value associated with the reader/writer unit ID (step S406). Next, the data processing unit 103 processes the print data in accordance with the function ID and the setting value (step S407). Specifically, the data processing unit 103 performs image processing, etc., on the received print data, and the printer unit 104 outputs, onto an output medium, the print data that have undergone image processing. The sheet eject unit 105 ejects the output medium in accordance with the function ID and the setting value. For example, when the function ID is "outtray" and the setting value is "finisherupper", the output medium onto which the print data have been output is ejected to the "finisherupper" tray.

In this manner, by bringing the IC card 200 near the reader/writer unit 101 provided at a tray of the MFP 100, the MFP 100 can read the print data from the IC card 200 and an instruction can be given to specify the MFP 100 and the sheet eject tray to be used for outputting the print data. Accordingly, the user can give an instruction to specify a tray to which the output medium is to be ejected, upon actually checking the trays of the MFP 100. Therefore, the output medium can be ejected to a tray that is not being used, thereby enhancing convenience.

Furthermore, the user can give an instruction to specify a tray by bringing the IC card 200 near the tray that the user desires to use for ejecting the output medium. Accordingly, an instruction can be directly given in a manner that matches the human's senses, thereby realizing a user-friendly interface.

In the present embodiment, an instruction is given for specifying the tray to be used for ejecting the output medium. However, the instruction is not limited to specifying the tray to be used for ejecting the output medium. For example, a reader/writer unit can be provided for each sheet feeding tray, and an instruction can be given to specify a sheet feeding tray with the IC card. Furthermore, the present invention is not limited to an image forming apparatus. An embodiment of the present invention can be applied to a case of displaying data on a display screen of a personal computer. An IC card can be brought near one of the reader/writer units provided at four corners of the display screen to give an instruction specifying the position at which the data are to be displayed.

Figure 5:
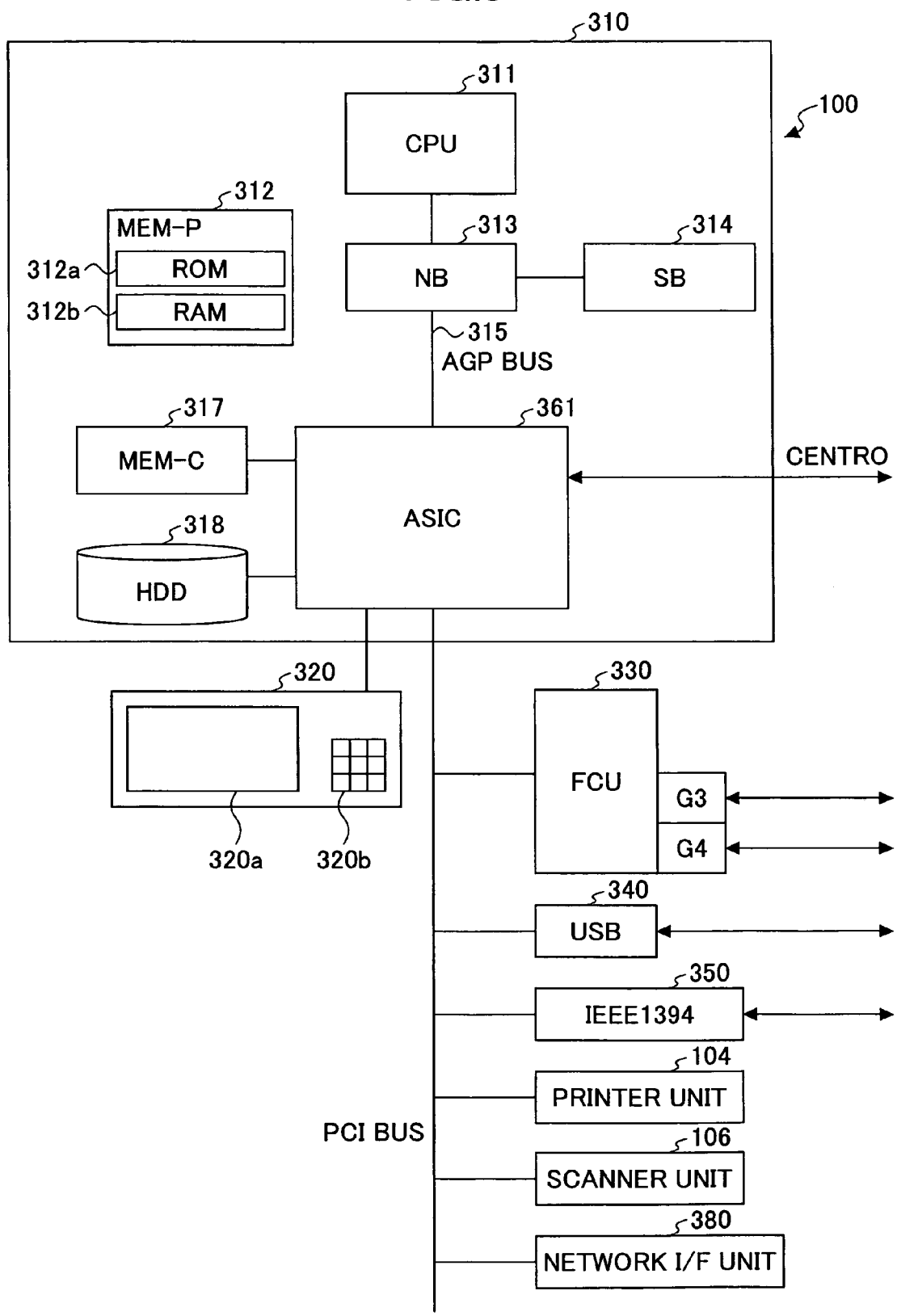
FIG. 5 is a block diagram of the hardware configuration of an MFP according to the first embodiment of the present invention.

Next, a description is given of the hardware configuration of the MFP 100. FIG. 5 is a block diagram of the hardware configuration of the MFP 100 according to the present embodiment. As shown in FIG. 5, the digital MFP 100 includes a controller 310, the printer unit 104, and the scanner unit 106, which are interconnected by a PCI (Peripheral Component Interconnect). The controller 310 is for controlling the entire digital MFP 100, rendering operations, communications, and input from an operations unit 320. The printer unit 104 and the scanner unit 106 include image processing parts such as error diffusion and gamma conversion. The operations unit 320 includes an operations display unit 320a used for displaying, on an LCD (Liquid Crystal Display), original image information obtained by scanning an original with the scanner unit 106, and receiving input from the operator via a touch panel; and a keyboard unit 320b for receiving key input from the operator.

Functions of the digital MFP 100 according to an embodiment of the present invention can be switched by application switch keys of the operations unit 320, to select a document box function, a copier function, a printer function, or a facsimile function. When the document box function is selected, the digital MFP 100 is in a document box mode. When the copier function is selected, the digital MFP 100 is in a copy mode. When the printer function is selected, the digital MFP 100 is in a printer mode. When the facsimile function is selected, the digital MFP 100 is in a facsimile mode.

The controller 310 includes a CPU (Central Processing Unit) 311 which is the main part of the computer, a system memory (MEM-P) 312, a north bridge (NB) 313, a south bridge (SB) 314, an ASIC (Application Specific Integrated Circuit) 316, a local memory (MEM-C) 317 which is a storage unit, a hard disk drive (HDD) 318 which is a storage unit, and an AGP (Accelerated Graphics Port) bus 315 connecting the NB 313 and the ASIC 316. Furthermore, the MEM-P 312 includes a ROM (Read Only Memory) 312a and a RAM (Random Access Memory) 312b.

The CPU 311 controls the entire digital MFP 100, and includes a chip set including the MEM-P 312 and the SB 314. The CPU 311 is connected to other devices via the chip set.

The NB 313 is for interconnecting the CPU 311, the MEM-P 312, the SB 314, and the AGP bus 315. The NB 313 includes a memory controller for controlling operations of reading from/writing in the MEM-P 312, a PCI master, and an AGP target.

The MEM-P 312 is a system memory to be used for holding programs and data, for expanding programs and data, and for rendering operations performed by the printer. The MEM-P 312 includes the ROM 312a and the RAM 312b. The ROM 312a is a read-only memory used for storing programs and data for controlling operations of the CPU 311. The RAM 312b is a read-write memory used for holding programs and data and for rendering operations performed by the printer.

The SB 314 is for interconnecting the NB 313, the PCI device, and peripheral devices. The SB 314 is connected to the NB 313 via the PCI bus. A network interface (I/F) unit 380 is also connected to the PCI bus.

The ASIC 316 is an IC (Integrated Circuit) to be used for image processing, which includes hardware elements for image processing. The ASIC 316 functions as a bridge for connecting the AGP bus 315, the PCI bus, the HDD 318, and the MEM-C 317. The ASIC 316 includes a PCI target, an AGP master, an arbiter (ARB) which is a central element of the ASIC 316, a memory controller for controlling the MEM-C 317, plural DMACs (Direct Memory Access Controller) for rotating image data according to hardware logic, and a PCI unit for transferring data via the PCI bus between the printer unit 104 and the scanner unit 106. A FCU (Fax Control Unit) 330, a USB (Universal Serial Bus) 340, and an IEEE 1394 (the Institute of Electrical and Electronics Engineers 1394) interface 350 are connected to the ASIC 316 via the PCI bus.

The MEM-C 317 is a local memory to be used as a copy image buffer and a code buffer. The HDD 318 is a storage unit for accumulating image data, programs for controlling operations of the CPU 311, font data, and forms.

The AGP bus 315 is a bus interface for a graphics accelerator card proposed for increasing the speed of graphic processes. By directly accessing the MEM-P 312 with high throughput, the speed of the graphics accelerator card is increased.

The program executed by the MFP 100 according to the present embodiment is provided in a ROM. The program executed by the MFP 100 according to the present embodiment can be recorded as a file having an installable format or an executable format in a computer-readable recording medium such as a CD-ROM, a flexible disk (FD), a CD-R, a DVD (Digital Versatile Disk).

Furthermore, the program executed by the MFP 100 according to the present embodiment can be stored in a computer connected to a network such as the Internet, so that the program can be provided by being downloaded via the network. Moreover, the program executed by the MFP 100 according to the present embodiment can be provided or distributed via a network such as the Internet.

The program executed by the MFP 100 according to the present embodiment has a configuration of a module including the above units (communication control unit of the reader/writer units, function acquiring unit, data processing unit, facsimile transmission/reception unit, etc.). As to the actual hardware, the CPU (processor) reads a program from the ROM and executes the program so that the above-described units are loaded in the main memory, and the communication control unit of the reader/writer units, the function acquiring unit, the data processing unit, and the facsimile transmission/reception unit are generated in the main memory.

The function association storage unit 108 can be any typical recording medium such as an HDD (Hard Disk Drive), an optical disk, and a memory card.

In the above-described embodiment, a multifunction peripheral is taken as an example. However, an embodiment of the present invention is not limited to an MFP; an embodiment of the present invention can be applied to various devices such as a copier, a facsimile machine, and a printer.

In the present embodiment, each reader/writer unit 101 holds a reader/writer unit ID, and a process is performed for acquiring the function ID and the setting value stored in the function association storage unit 108, which are associated with the reader/writer unit ID. However, in second through fourth embodiments described below, each reader/writer unit 101 can hold a reader/writer unit ID, a function ID, and a setting value. Details are described below.

Second Embodiment

A description is given of a second embodiment of the present invention with reference to the accompanying drawings. A description is given of parts that are different from the first embodiment in the configuration of the MFP and the mobile terminal device to which an embodiment of the present invention is applied. The other parts are the same as those of the first embodiment, which are described above and thus not further described.

Figure 6:
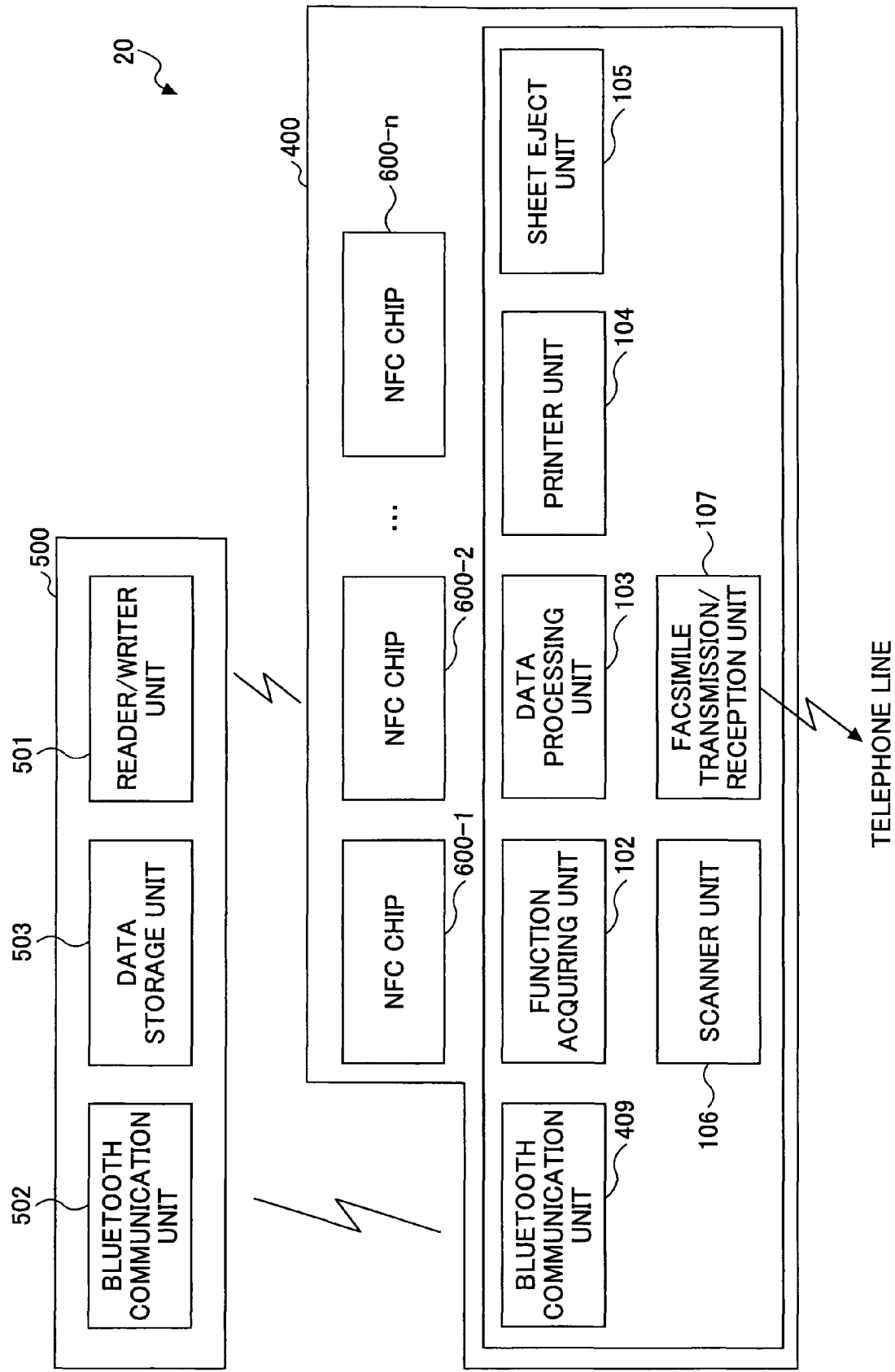
FIG. 6 is a block diagram of a printing system according to a second embodiment of the present invention.

FIG. 6 is a block diagram of a printing system according to the second embodiment of the present invention. A printing system 20 according to the second embodiment includes an MFP 400 and a mobile terminal device 500. The MFP 400 and the mobile terminal device 500 can communicate with each other by non-contact communication. In the MFP 400, an NFC chip is adhered onto each of the plural paper eject trays.

First, the mobile terminal device 500 is described. The mobile terminal device 500 includes a reader/writer unit 501, a Bluetooth communication unit 502, and a data storage unit 503. Specifically, as in the first embodiment, the mobile terminal device 500 can be a mobile phone, a PDA, a notebook computer, a portable information storage medium, or an IC card, which has such a configuration.

The reader/writer unit 501 has the same function and structure as the reader/writer unit 101 of the MFP 100 described above. When the mobile terminal device 500 comes within the communication region of any one of NFC chips 600-1 through 600-n provided at each sheet eject tray of the MFP 400, the reader/writer unit 501 establishes communication with the corresponding NFC chip 600, and reads an MFP ID, a function ID, and a setting value stored in the NFC chip 600.

The Bluetooth communication unit 502 is for communicating in a non-contact manner with the MFP 400 according to the Bluetooth® specification. The Bluetooth communication unit 502, which employs a wireless communication method according to the Bluetooth® specification, transmits/receives data of larger capacity and at higher speed (1-2 Mbps) compared to NFC communication which is a non-contact communication method according to the NFC specification. Furthermore, the Bluetooth communication unit 502, which employs a wireless communication method according to the Bluetooth® specification, can be used even when there is an obstacle, as long as the distance between the communication devices is less than or equal to 10 m. Moreover, the communication region of the communication method according to the Bluetooth® specification is longer than that of the NFC specification.

Specifically, the Bluetooth communication unit 502 includes a Bluetooth® I/F (interface) such as a transceiver according to the Bluetooth® specification used for performing transmission/reception of data, and a communication control unit. The Bluetooth® I/F is used for performing transmission/reception of data between the MFP 400 with which communication has been established. The communication control unit is a communication control program for executing a process of exchanging communication setting information with the communication destination via the Bluetooth® I/F and establishing wireless communications according to the Bluetooth® specification, before transmission/reception of data with the MFP 400 is performed. Unique address information allocated to the Bluetooth® I/F is used as the communication setting information.

The present embodiment includes the Bluetooth communication unit 502 conforming to the Bluetooth® specification for wireless communication; however, an embodiment of the present invention is not limited thereto. Wireless communication can be performed by methods conforming to specifications other than Bluetooth®, such as the WiFi (Wireless Fidelity) method according to the IEEE 802.11a/IEEE 802.11b specification. In this case, a WiFi communication unit is to include a network board according to the IEEE 802.11a/IEEE 802.11b specification used for performing transmission/reception of data, and a communication control unit (communication control program) for establishing wireless communication according to IEEE 802.11a/IEEE 802.11b and for controlling transmission/reception of data. When the distance between devices is less than or equal to 3 m in the UWB method, wireless communication can be performed according to the Wireless USB specification with which communication can be performed at 480 Mbps, which is the same as that of wired communication according to USB 2.0. In this case, a Wireless USB communication unit is to include a USB device according to the Wireless USB specification used for performing transmission/reception of data, and a communication control unit (communication control program) for establishing wireless communication according to the UWB method and for controlling transmission/reception of data.

Furthermore, when Bluetooth communication is established, the Bluetooth communication unit 502 sends print data stored in the data storage unit 503 to the MFP 400.

Next, a description is given of the MFP 400. The MFP 400 includes a Bluetooth communication unit 409, the function acquiring unit 102, the data processing unit 103, the printer unit 104, the sheet eject unit 105, the scanner unit 106, and the facsimile transmission/reception unit 107. The function acquiring unit 102, the data processing unit 103, the printer unit 104, the sheet eject unit 105, the scanner unit 106, and the facsimile transmission/reception unit 107 have substantially the same configurations and functions as those of the first embodiment, and are thus not further described.

When communication is established with the Bluetooth communication unit 502 of the mobile terminal device 500, the Bluetooth communication unit 409 receives print data sent from the mobile terminal device 500.

Next, a description is given of the NFC chips 600-1 through 600-$n$ provided in the MFP 400. Each of the NFC chips 600-1 through 600-$n$ is provided at one of the plural sheet eject trays. FIG. 7 illustrates an example of data stored in the NFC chip. As shown in FIG. 7, the NFC chip stores an MFP ID for identifying the MFP 400 in which the NFC chip is provided, a function ID indicating a function that is to be performed as the NFC chip is read, and a setting value indicating the contents of the function. For example, an MFP ID "XXXXXX", a function ID "outtray", and a setting value "internal" are stored. The MFP ID can be the IP address of the MFP.

Figure 8:
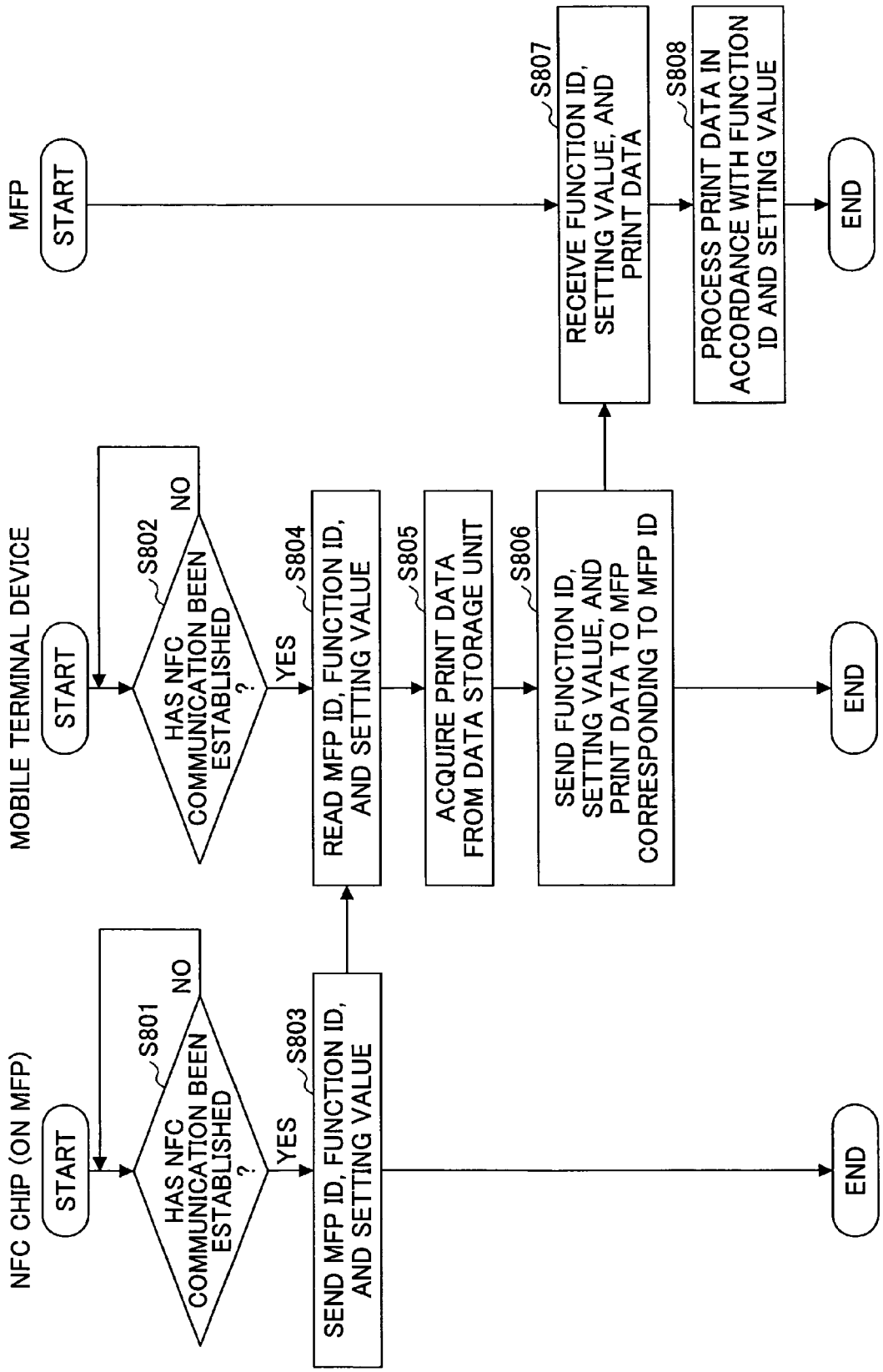
FIG. 8 is a flowchart of function setting/function processing procedures performed by the printing system according to the second embodiment of the present invention.

Next, a description is given of function setting/function processing procedures performed by the printing system 20 including the MFP 400 and the mobile terminal device 500 having the above configurations. FIG. 8 is a flowchart of function setting/function processing procedures performed by the printing system 20.

First, each of the NFC chips 600-1 through 600-$n$ provided at one of the plural trays of the MFP 400 determines whether NFC communication has been established with the reader/writer unit 501 of the mobile terminal device 500 (step S801). When the NFC chip 600 determines that NFC communication has not been established, i.e., the reader/writer unit 501 of the mobile terminal device 500 is not present in the communication region of the NFC chip 600 (No in step S801), step S801 is repeated until communication is established with the reader/writer unit 501 of the mobile terminal device 500.

Similarly, the reader/writer unit 501 of the mobile terminal device 500 determines whether NFC communication has been established with any of the NFC chips 600 (step S802). When the reader/writer unit 501 determines that NFC communication has not been established, i.e., the reader/writer unit 501 of the mobile terminal device 500 is not present in the communication region of any of the NFC chips 600 (No in step S802), step S802 is repeated until communication is established with any of the NFC chips 600.

Next, when NFC communication is established, i.e., the mobile terminal device 500 is present in the communication region of one of the NFC chips 600-1 through 600-$n$ (Yes in step S801), the NFC chip 600 sends out an MFP ID, a function ID, and a setting value (step S803). When "the mobile terminal device 500 is present in the communication region", it means that the mobile terminal device 500 held by the user is touching the NFC chip 600 of the MFP 400, so that the user can surely give an instruction to specify the tray to which the output medium is to be ejected.

When the mobile terminal device 500 determines that NFC communication has been established, i.e., the mobile terminal device 500 is present in the communication region of one of the NFC chips 600 (Yes in step S802), the reader/writer unit 501 reads the MFP ID, the function ID, and the setting value from the corresponding NFC chip 600 (step S804). Next, the Bluetooth communication unit 502 acquires print data from the data storage unit 503 (step S805). The Bluetooth communication unit 502 sends the function ID, the setting value, and the print data to the MFP 400 corresponding to the MFP ID (step S806). It is assumed that the communication setting information necessary for Bluetooth communications is exchanged beforehand between the MFP 400 and the mobile terminal device 500.

In the MFP 400, the Bluetooth communication unit 409 receives the function ID, the setting value, and print data sent from the mobile terminal device 500 (step S807). Next, the processing unit processes the print data in accordance with the function ID and the setting value (step S808). Specifically, the data processing unit 103 performs image processing on the received print data, and the printer unit 104 outputs the print data that have undergone image processing to an output medium. The sheet eject unit 105 ejects the output medium in accordance with the function ID and the setting value. For example, when the function ID is "outtray" and the setting value is "finisherupper", the output medium on which the print data are output is ejected from a "finisherupper" tray.

As described above, a Bluetooth communication unit is provided in both the MFP 400 and the mobile terminal device 500. By sending the print data to the MFP 400 by Bluetooth communications, the data can be sent at a higher speed than the case of NFC communications. Accordingly, the transfer time can be reduced.

Furthermore, the mobile terminal device 500 can be a mobile phone, a PDA, or a notebook computer provided with the reader/writer unit 501. Accordingly, the mobile terminal device 500 can store print data of a larger capacity compared to the IC card described in the first embodiment.

Third Embodiment

A description is given of a third embodiment of the present invention with reference to the accompanying drawings. A description is given of parts in the configuration of the MFP and the mobile terminal device to which the third embodiment of the present invention is applied, which parts are different from the first embodiment. The other parts are the same as those of the first embodiment, which are described above and thus not further described.

Figure 9:
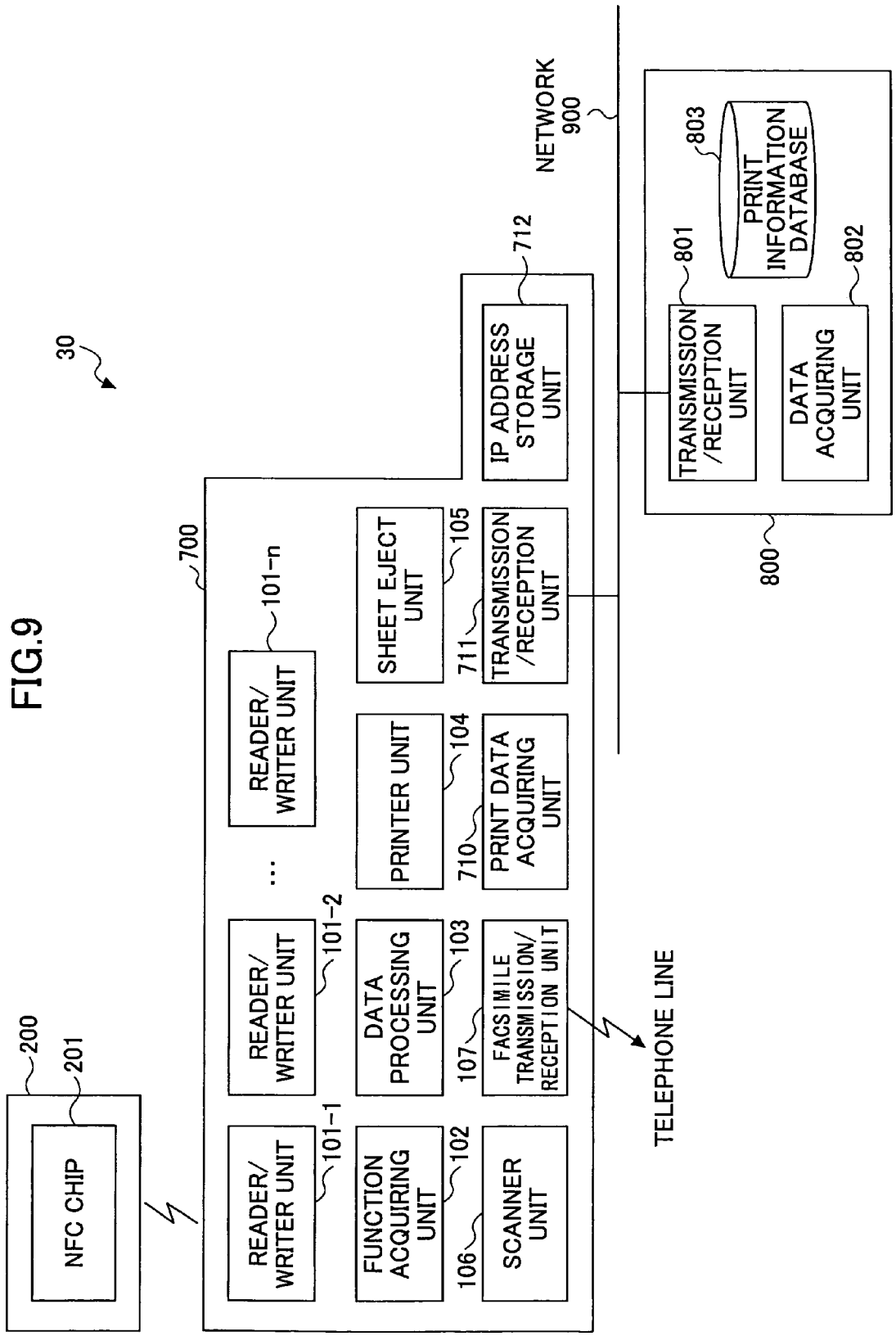
FIG. 9 is a block diagram of a printing system according to a third embodiment of the present invention.

FIG. 9 is a block diagram of a printing system according to the third embodiment of the present invention. A printing system 30 according to the third embodiment includes an MFP 700, the mobile terminal device 200, and a server device 800. The MFP 700 and the mobile terminal device 200 can communicate with each other by non-contact communications. The MFP 700 and the server device 800 are connected via a network 900 of a wired or wireless LAN (Local Area Network) using a protocol such as TCP/IP, so that communications can be performed via the network 900.

The IC card 200 has substantially the same functions and configurations as those of the first embodiment, and is thus not further described. The data stored in the NFC chip 201 are not print data; the data in the NFC chip 201 are affiliation information. The affiliation information is for identifying the owner of the print data, such as a user name or a user ID.

Next, a description is given of the MFP 700. The MFP 700 includes the reader/writer units 101-1 through 101-*n*, the function acquiring unit 102, the data processing unit 103, the printer unit 104, the sheet eject unit 105, the scanner unit 106, the facsimile transmission/reception unit 107, a print data acquiring unit 710, a transmission/reception unit 711, and an IP address storage unit 712. The reader/writer units 101-1 through 101-*n*, the function acquiring unit 102, the data processing unit 103, the printer unit 104, the sheet eject unit 105, the scanner unit 106, and the facsimile transmission/reception unit 107 have substantially the same configurations and functions as those of the first embodiment, and are thus not further described.

The reader/writer units 101-1 through 101-*n* have substantially the same functions and configurations as those of the first embodiment. When the mobile terminal device 200 approaches the communication region of any one of the reader/writer units 101-1 through 101-*n*, the corresponding reader/writer unit 101 reads affiliation information from the mobile terminal device 200.

The IP address storage unit 712 stores the IP address of the server device 800 storing the print data.

The print data acquiring unit 710 uses the IP address stored in the IP address storage unit 712 to send an affiliation information transmission instruction to the server device 800 corresponding to the IP address. Furthermore, the print data acquiring unit 710 determines whether the affiliation information sent from the server device 800 corresponds to the affiliation information read by the reader/writer unit 101. When they correspond to each other, the print data acquiring unit 710 acquires, from the server device 800, the print data associated with the affiliation information.

The transmission/reception unit 711 performs transmission/reception of data with the server device 800 via the network 900. The transmission/reception unit 711 sends an affiliation information transmission request to the server device 800, and receives affiliation information corresponding to the affiliation information transmission request from the server device 800. Furthermore, the transmission/reception unit 711 sends affiliation information to the server device 800, and receives print information associated with the affiliation information.

Next, a description is given of the server device 800. The server device 800 includes a transmission/reception unit 801, a data acquiring unit 802, and a print information database 803. Other functions and configurations are the same as a typical server device, and are thus not described in detailed.

The transmission/reception unit 801 performs transmission/reception of data with the MFP 700 via the network 900. The transmission/reception unit 801 receives the affiliation information transmission request sent from the MFP 700, and sends the affiliation information corresponding to the affiliation information transmission request to the MFP 700. Furthermore, the transmission/reception unit 801 receives affiliation information from the MFP 700, and sends out print data associated with the affiliation information.

The print information database 803 stores the affiliation information and print data in association with each other. FIG. 10 illustrates an example of a data configuration of the print information database 803.

The data acquiring unit 802 acquires affiliation information stored in the print information database 803 when the transmission/reception unit 801 receives an affiliation information transmission request. Furthermore, the data acquiring unit 802 acquires the print data associated with the affiliation information from the print information database 803 when the transmission/reception unit 801 receives the affiliation information.

Next, a description is given of function setting/function processing procedures performed by the printing system 30 including the MFP 700, the IC card 200, and the server device 800 having the above configurations. FIG. 11 is a flowchart of function setting/function processing procedures performed by the printing system 30.

First, in the IC card 200, the NFC chip 201 determines whether NFC communication has been established with the reader/writer unit 101 of the MFP 700 (step S1101). When the NFC chip 201 determines that NFC communication has not been established, i.e., the IC card 200 is not present in the communication region of any of the reader/writer units 101

(No in step S1101), step S1101 is repeated until communication is established with the reader/writer unit 101 of the MFP 700.

Similarly, each of the reader/writer units 101-1 through 101-n of the MFP 700 determines whether NFC communication has been established with the NFC chip 201 of the IC card 200 (step S1102). When the reader/writer unit 101 determines that NFC communication has not been established, i.e., the IC card 200 is not present in the communication region of any of the reader/writer units 101 (No in step S1102), step S1102 is repeated until communication is established with the NFC chip 201 of the IC card 200.

Next, when NFC communication is established, i.e., the IC card 200 is present in the communication region of one of the reader/writer units 101-1 through 101-n (Yes in step S1101), the NFC chip 201 sends out affiliation information stored therein (step S1103). When "the IC card 200 is present in the communication region", it means that the IC card 200 held by the user is touching one of the reader/writer units 101 of the MFP 700, so that the user can surely give an instruction to specify the tray to which the output medium is to be ejected.

When one of the reader/writer units 101 in the MFP 700 determines that NFC communication has been established, i.e., the IC card 200 is present in the communication region of one of the reader/writer units 101 (Yes in step S1102), the corresponding reader/writer unit 101 reads the affiliation information from the NFC chip 201 of the IC card 200 (step S1104). The function acquiring unit 102 acquires the function ID and the setting value held by the reader/writer unit 101 that has read the affiliation information (step S1105). The print data acquiring unit 710 determines whether the affiliation information has been completely received (step S1106). When the print data acquiring unit 710 determines that the affiliation information has been completely received (Yes in step S1106), the process ends. When the print data acquiring unit 710 determines that the affiliation information has not been completely received (No in step S1106) the transmission/reception unit 711 sends an affiliation information transmission request to the server device 800 (step S1107).

In the server device 800, the transmission/reception unit 801 receives the affiliation information transmission request (step S1108). The data acquiring unit 802 acquires affiliation information from the print information database 803 (step S1109). The transmission/reception unit 801 sends the affiliation information to the MFP 700 (step S1110).

In the MFP 700, the transmission/reception unit 711 receives the affiliation information (step S1111). The print data acquiring unit 710 determines whether the affiliation information read from the IC card 200 corresponds to the affiliation information sent from the server device 800 (step S1112). When the print data acquiring unit 710 determines that the affiliation information read from the IC card 200 does not correspond to the affiliation information sent from the server device 800 (No in step S1112), the process control returns to step S1106.

When the print data acquiring unit 710 determines that the affiliation information read from the IC card 200 corresponds to the affiliation information sent from the server device 800 (Yes in step S1112), the transmission/reception unit 711 sends a print data transmission instruction to the server device 800 (step S1113).

In the server device 800, the transmission/reception unit 801 receives the print data transmission instruction (step S1114). The data acquiring unit 802 acquires print data associated with the affiliation information from the print information database 803 (step S1115). The transmission/reception unit 801 sends the print data to the MFP 700 (step S1116).

In the MFP 700, the transmission/reception unit 711 receives the print data (step S1117). Next, the data processing unit 103 processes the print data in accordance with the function ID and the setting value (step S1118). Specifically, the data processing unit 103 performs image processing, etc., on the received print data, and the printer unit 104 outputs, onto an output medium, the print data that have undergone image processing. The sheet eject unit 105 ejects the output medium in accordance with the function ID and the setting value. For example, when the function ID is "outtray" and the setting value is "finisherupper", the output medium onto which the print data have been output is ejected to the "finisherupper" tray.

In this manner, the print data are stored in the server device 800, and not in the MFP 700 or the IC card 200 that instructs a function. When the IC card 200 instructs the MFP 700 to output print data, the print data are received from the server device 800. Accordingly, the print data do not need to be stored in the IC card 200, and therefore high-volume print data can be output.

Fourth Embodiment

A description is given of a fourth embodiment of the present invention with reference to the accompanying drawings. A description is given of parts in the configuration of the MFP and the mobile terminal device to which the fourth embodiment of the present invention is applied, which parts are different from the first embodiment. The other parts are the same as those of the first embodiment, which are described above and thus not further described.

FIG. 12 is a block diagram of a printing system according to the fourth embodiment of the present invention. A printing system 40 according to the fourth embodiment includes an MFP 1000, the mobile terminal device 500, and a server device 1100. The MFP 1000 and the mobile terminal device 500 can communicate with each other by non-contact communications, and the server device 1100 and the mobile terminal device 500 can communicate with each other by non-contact communications. The MFP 1000 and the server device 1100 are connected via the network 900 of a wired or wireless LAN (Local Area Network) using a protocol such as TCP/IP, so that communications can be performed via the network 900. In the MFP 1000, one of the NFC chips 600-1 through 600-n is adhered onto each of the plural paper eject trays, as in the second embodiment.

The MFP 1000 includes the function acquiring unit 102, the data processing unit 103, the printer unit 104, the sheet eject unit 105, the scanner unit 106, the facsimile transmission/reception unit 107, and the transmission/reception unit 711. The function acquiring unit 102, the data processing unit 103, the printer unit 104, the sheet eject unit 105, the scanner unit 106, the facsimile transmission/reception unit 107, and the transmission/reception unit 711 have substantially the same configurations and functions as those of the first and second embodiments, and are thus not further described.

The mobile terminal device 500 has substantially the same function and configuration as that of the second embodiment, which is described above and thus not further described.

The server device 1100 includes a Bluetooth communication unit 1104, the transmission/reception unit 801, the data acquiring unit 802, and the print information database 803. The transmission/reception unit 801, the data acquiring unit 802, and the print information database 803 have substantially the same configurations and functions as those of the third embodiment, and are thus not further described. The Bluetooth communication unit 1104 has substantially the same function and configuration as that of the Bluetooth communication unit 409 of the MFP 400 described in the second embodiment, which are described for the second embodiment and thus not further described.

Next, a description is given of function setting/function processing procedures performed by the printing system 40 including the NFC chips 600 adhered to the MFP 1000, the mobile terminal device 500, the server device 1100, and the MFP 1000 having the above configurations. FIG. 13 is a flowchart of function setting/function processing procedures performed by the printing system 40.

First, each of the NFC chips 600-1 through 600-n provided at one of the plural trays of the MFP 1000 determines whether NFC communication has been established with the reader/writer unit 501 of the mobile terminal device 500 (step S1301). When the NFC chip 600 determines that NFC communication has not been established, i.e., the reader/writer unit 501 of the mobile terminal device 500 is not present in the communication region of the NFC chip 600 (No in step S1301), step S1301 is repeated until communication is established with the reader/writer unit 501 of the mobile terminal device 500.

Similarly, the reader/writer unit 501 of the mobile terminal device 500 determines whether NFC communication has been established with any of the NFC chips 600 (step S1302). When the reader/writer unit 501 determines that NFC communication is not established, i.e., the reader/writer unit 501 of the mobile terminal device 500 is not present in the communication region of any of the NFC chips 600 (No in step S1302), step S1302 is repeated until communication is established with any of the NFC chips 600.

Next, when NFC communication is established, i.e., the mobile terminal device 500 is present in the communication region of one of the NFC chips 600-1 through 600-n (Yes in step S1301), the NFC chip 600 sends out an MFP ID, a function ID, and a setting value (step S1303). When "the mobile terminal device 500 is present in the communication region", it means that the mobile terminal device 500 held by the user is touching the NFC chip 600 of the MFP 1000, so that the user can surely give an instruction to specify the tray to which the output medium is to be ejected.

When the mobile terminal device 500 determines that NFC communication has been established, i.e., the mobile terminal device 500 is present in the communication region of one of the NFC chips 600 (Yes in step S1302), the reader/writer unit 501 reads the MFP ID, the function ID, and the setting value from the corresponding NFC chip 600 (step S1304). Next, the Bluetooth communication unit 502 acquires affiliation information from the data storage unit 503 (step S1305). The Bluetooth communication unit 502 sends the MFP ID, the function ID, the setting value, and the affiliation information to the server device 1100 (step S1306). It is assumed that the communication setting information necessary for Bluetooth communications is exchanged beforehand between the server device 1100 and the mobile terminal device 500.

In the server device 1100, the Bluetooth communication unit 1104 receives the MFP ID, the function ID, the setting value, and the affiliation information sent from the mobile terminal device 500 (step S1307). The data acquiring unit 802 acquires the print data associated with the affiliation information from the print information database 803 (step S1308). The transmission/reception unit 801 sends the function ID, the setting value, and the print data to the MFP 1000 corresponding to the MFP ID (step S1309).

In the MFP 1000, the transmission/reception unit 711 receives the function ID, the setting value, and the print data (step S1310). Next, the processing unit processes the print data in accordance with the function ID and the setting value (step S1311). Specifically, the data processing unit 103 performs image processing on the received print data, and the printer unit 104 outputs the print data that have undergone image processing to an output medium. The sheet eject unit 105 ejects the output medium in accordance with the function ID and the setting value. For example, when the function ID is "outtray" and the setting value is "finisherupper", the output medium on which the print data are output is ejected from a "finisherupper" tray.

As described above, by adhering one of the NFC chips to each of the sheet eject trays of the MFP 1000, an instruction can be given to the MFP 1000 for outputting the print data and for specifying the tray for ejecting the output medium. Accordingly, a print instruction can be given to the MFP and also an instruction can be given for specifying the sheet eject tray without changing the hardware configuration of the MFP 1000.

An aspect in accordance with the present invention provides an image forming apparatus for performing communications in a non-contact manner with a separate device storing print information, the separate device being a mobile terminal device, the image forming apparatus including a function association storing unit configured to store, in association with each other, identification information for identifying a reading unit configured to read the print information, function information indicating a function of processing the print information, and function setting information indicating process contents of the function; the reading unit configured to read the print information stored in the mobile terminal device, the reading unit being disposed in the image forming apparatus at a position according to the function information and the function setting information; a function acquiring unit configured to acquire, from the function association storing unit, the function information and the function setting information associated with the identification information held by the reading unit that has read the print information; and a processing unit configured to process the print information based on the function information and the function setting information acquired by the function acquiring unit.

Another aspect in accordance with the present invention provides an image forming apparatus for performing communications in a non-contact manner with a first separate device, the first separate device being a mobile terminal device, wherein the image forming apparatus is connected to a second separate device via a network, the second separate device being a server device, the image forming apparatus including a reading unit configured to read, from the mobile terminal device, affiliation information indicating an owner of print information; a function acquiring unit configured to acquire function information and function setting information held by the reading unit that has read the affiliation information; a receiving unit configured to receive, from the server device, the print information associated with the affiliation information read by the reading unit; and a processing unit configured to process the print information received by the receiving unit in accordance with the function information and the function setting information acquired by the function acquiring unit.

Another aspect in accordance with the present invention provides the image forming apparatus according to the above aspects, wherein plural of the reading units are provided; each of the reading units is provided at one of a plurality of trays used for ejecting an output medium onto which the print information is printed; and the processing unit determines which one of the trays is to be used for ejecting the output medium based on the function information and the function setting information acquired by the function acquiring unit, and ejects the output medium to the tray determined to be used.

Another aspect in accordance with the present invention provides an image forming apparatus for performing communications in a non-contact manner with a separate device configured to store print information and read information stored in an information storage medium, the separate device being a mobile terminal apparatus, the image forming apparatus including a receiving unit configured to receive, from the mobile terminal apparatus, the print information, image forming apparatus identification information for identifying the image forming apparatus, which image forming apparatus identification information has been read by the mobile terminal device from the information storage medium provided in the image forming apparatus, function information indicating a function of processing the print information, and function setting information indicating process contents of the function; and a processing unit configured to process the print information based on the print information, the function information, and the function setting information received by the receiving unit.

Another aspect in accordance with the present invention provides the image forming apparatus according to the above aspect, wherein plural of the information storage media are provided; the receiving unit receives the print information, the image forming apparatus identification information for identifying the image forming apparatus, which image forming apparatus identification information has been read from one of the information storage media provided at one of a plurality of trays used for ejecting an output medium onto which the print information is printed, the function information indicating the function of processing the print information, and the function setting information indicating the process contents of the function; and the processing unit determines which one of the trays is to be used for ejecting the output medium based on the function information and the function setting information received by the receiving unit, and ejects the output medium to the tray determined to be used.

Another aspect in accordance with the present invention provides a printing system including a mobile terminal device; and an image forming apparatus configured to perform communications in a non-contact manner with the mobile terminal device, wherein the mobile terminal device includes an information storage medium for storing print information; and the image forming apparatus includes a function association storing unit configured to store, in association with each other, identification information for identifying a reading unit configured to read the print information from the mobile terminal device, function information indicating a function of processing the print information, and function setting information indicating process contents of the function; the reading unit configured to read the print information stored in the mobile terminal device, the reading unit being disposed in the image forming apparatus at a position according to the function information and the function setting information; a function acquiring unit configured to acquire, from the function association storing unit, the function information and the function setting information associated with the identification information held by the reading unit that has read the print information; and a processing unit configured to process the print information based on the function information and the function setting information acquired by the function acquiring unit.

Another aspect in accordance with the present invention provides a printing system including an image forming apparatus; a server device; and a mobile terminal device, wherein the image forming apparatus and the server device are connected via a network; the image forming apparatus and the mobile terminal device perform communications in a non-contact manner with one another; the mobile terminal device includes an information storage medium for storing affiliation information indicating an owner of print information; the server device includes a storing unit configured to store the affiliation information and the print information in association with each other, a first receiving unit configured to receive the affiliation information from the image forming apparatus, a first acquiring unit configured to acquire, from the storing unit, the print information associated with the affiliation information received by the first receiving unit, and a sending unit configured to send the print information acquired by the first receiving unit; and the image forming apparatus includes a reading unit configured to read the affiliation information from the mobile terminal device, the reading unit holding function information indicating a function of processing the print information and function setting information indicating process contents of the function, a second acquiring unit configured to acquire the function information and the function setting information held by the reading unit that has read the affiliation information, a second receiving unit configured to receive the print information from the server device, and a processing unit configured to process the print information received by the second receiving unit based on the function information and the function setting information acquired by the second acquiring unit.

Another aspect in accordance with the present invention provides a printing system including a mobile terminal device; and an image forming apparatus, wherein the mobile terminal device and the image forming apparatus perform communications in a non-contact manner with one another; the mobile terminal device includes a storing unit configured to store print information, a reading unit configured to read image forming apparatus identification information for identifying the image forming apparatus, function information indicating a function of processing the print information, and function setting information indicating process contents of the function, which are stored in an information storing medium disposed at a position in the image forming apparatus, and a sending unit configured to send, to the image forming apparatus indicated by the image forming apparatus identification information, the function information, the function setting information, and the print information stored in the storing unit; and the image forming apparatus includes a receiving unit configured to receive the function information, the function setting information, and the print information, and a processing unit configured to process the print information based on the function information and the function setting information received by the receiving unit.

Another aspect in accordance with the present invention provides a printing system including a mobile terminal device; a server device; and an image forming apparatus, wherein the mobile terminal device and the server device perform communications in a non-contact manner with one another; the mobile terminal device and the image forming apparatus perform communications in a non-contact manner with one another; the mobile terminal device includes a first storing unit configured to store affiliation information indicating an owner of print information, a reading unit configured to read image forming apparatus identification information for identifying the image forming apparatus, function information indicating a function of processing the print information, and function setting information indicating process contents of the function, which are stored in an information storing medium disposed in the image forming apparatus, and a first sending unit configured to send, to the server device, the image forming apparatus identification information, the function information, and the function setting information stored in the image forming apparatus indicated by the image forming apparatus identification information, and the affiliation information stored in the first storing unit; the server device includes a second storing unit configured to store, in association with each other, the affiliation information and the print information, a first receiving unit configured to receive the image forming apparatus identification information, the function information, the function setting information, and the affiliation information, an acquiring unit configured to acquire, from the second storing unit, the print information associated with the affiliation information received by the first receiving unit, and a second sending unit configured to send the print information acquired by the acquiring unit, the function information, and the function setting information to the image forming apparatus corresponding to the image forming apparatus identification information; and the image forming apparatus includes a second receiving unit configured to receive the print information, the function information, and the function setting information, and a processing unit configured to process the print information based on the function information and the function setting information received by the second receiving unit.

Another aspect in accordance with the present invention provides a program product including instructions for an image forming apparatus that performs, in a non-contact manner, communications with a separate device storing print information, the separate device being a mobile terminal device, the instructions causing the image forming apparatus to execute a reading step of causing a reading unit to read the print information stored in the mobile terminal device, the reading unit being disposed in the image forming apparatus at a position according to function information indicating a function of processing the print information and function setting information indicating process contents of the function; a function acquiring step of causing a function acquiring unit to acquire, from a function association storing unit, the function information and the function setting information corresponding to identification information held by the reading unit that has read the print information, wherein the function association storing unit stores, in association with each other, the identification information identifying the reading unit that reads the print information, the function information, and the function setting information; and a processing step of causing a processing unit to process the print information based on the function information and the function setting information acquired at the function acquiring step.

Another aspect in accordance with the present invention provides a program product including instructions for an image forming apparatus that performs, in a non-contact manner, communications with a first separate device, the first separate device being a mobile terminal device, the image forming apparatus being connected to a second separate device via a network, the second separate device being a server device, the instructions causing the image forming apparatus to execute a reading step of causing a reading unit to read, from the mobile terminal device, affiliation information indicating an owner of print information, wherein the reading unit holds function information indicating a function of processing the print information and function setting information indicating process contents of the function; a function acquiring step of causing a function acquiring unit to acquire the function information and the function setting information held by the reading unit that has read the affiliation information; a receiving step of causing a receiving unit to receive, from the server device, the print information associated with the affiliation information read at the reading step; and a processing step of causing a processing unit to process the print information received at the receiving step in accordance with the function information and the function setting information acquired at the function acquiring step.

Another aspect in accordance with the present invention provides a program product including instructions for an image forming apparatus that performs, in a non-contact manner, communications with a separate device configured to read information stored in an information storage medium and to store print information, the separate device being a mobile terminal device, the instructions causing the image forming apparatus to execute a receiving step of causing a receiving unit to receive, from the mobile terminal device, the print information, image forming apparatus identification information for identifying the image forming apparatus, which image forming apparatus identification information has been read by the mobile terminal device from the information storage medium provided in the image forming apparatus, function information indicating a function of processing the print information, and function setting information indicating process contents of the function; and a processing step of causing a processing unit to process the print information based on the print information, the function information, and the function setting information received at the receiving step.

The present invention is not limited to the specifically disclosed embodiments, and variations and modifications may be made without departing from the scope of the present invention. Furthermore, the configurations and functions of the above embodiments can be freely combined.

The present application is based on Japanese Priority Patent Application No. 2007-199932, filed on Jul. 31, 2007, and Japanese Priority Patent Application No. 2007-302394, filed on Nov. 22, 2007, the entire contents of which are hereby incorporated herein by reference.

What is claimed is:

1. An image forming apparatus for performing communications in a non-contact manner with a separate device storing print information, the separate device being a mobile terminal device, the image forming apparatus comprising:
a function association storing unit configured to store, in association with each other, identification information for identifying a reading unit configured to read the print information, function information indicating a function of processing the print information, and function setting information indicating process contents of the function;
the reading unit configured to read the print information stored in the mobile terminal device, the reading unit being disposed in the image forming apparatus at a position according to the function information and the function setting information;
a function acquiring unit configured to acquire, from the function association storing unit, the function information and the function setting information associated with the identification information held by the reading unit that has read the print information; and
a processing unit configured to process the print information based on the function information and the function setting information acquired by the function acquiring unit, wherein
plural of the reading units are provided, each of the reading units being provided at one of a plurality of trays used for ejecting an output medium onto which the print information is printed, and the processing unit determines which one of the trays is to be used for ejecting the output medium based on the function information and the function setting information acquired by the function acquiring unit, and ejects the output medium to the tray determined to be used.

2. An image forming apparatus for performing communications in a non-contact manner with a first separate device, the first separate device being a mobile terminal device, wherein the image forming apparatus is connected to a second separate device via a network, the second separate device being a server device, the image forming apparatus comprising:
- a reading unit configured to read, from the mobile terminal device, affiliation information indicating an owner of print information;
- a function acquiring unit configured to acquire function information and function setting information held by the reading unit that has read the affiliation information;
- a receiving unit configured to receive, from the server device, the print information associated with the affiliation information read by the reading unit; and
- a processing unit configured to process the print information received by the receiving unit in accordance with the function information and the function setting information acquired by the function acquiring unit, wherein
- plural of the reading units are provided, each of the reading units being provided at one of a plurality of trays used for ejecting an output medium onto which the print information is printed, and
- the processing unit determines which one of the trays is to be used for ejecting the output medium based on the function information and the function setting information acquired by the function acquiring unit, and ejects the output medium to the tray determined to be used.

3. An image forming apparatus for performing communications in a non-contact manner with a separate device configured to store print information and read information stored in an information storage medium, the separate device being a mobile terminal device, the image forming apparatus comprising:
- a receiving unit configured to receive, from the mobile terminal device, the print information, image forming apparatus identification information for identifying the image forming apparatus, which image forming apparatus identification information has been read by the mobile terminal device from the information storage medium provided in the image forming apparatus, function information indicating a function of processing the print information, and function setting information indicating process contents of the function; and
- a processing unit configured to process the print information based on the print information, the function information, and the function setting information received by the receiving unit, wherein
- plural of the information storage media are provided,
- the receiving unit receives the print information, the image forming apparatus identification information for identifying the image forming apparatus, which image forming apparatus identification information has been read from one of the information storage media provided at one of a plurality of trays used for ejecting an output medium onto which the print information is printed, the function information indicating the function of processing the print information, and the function setting information indicating the process contents of the function, and
- the processing unit determines which one of the trays is to be used for ejecting the output medium based on the function information and the function setting information received by the receiving unit, and ejects the output medium to the tray determined to be used.

* * * * *